Patented Feb. 28, 1950

2,499,307

UNITED STATES PATENT OFFICE 2,499,307

BARIUM DI-SILICATE PHOSPHOR

Robert J. Ginther, Salem, Mass., assignor to Sylvania Electric Products Inc., Salem, Mass., a corporation of Massachusetts No Drawing. Application January 3, 1946,
Serial No. 638,927

4 Claims. (Cl. 252—301.4)

This invention relates to fluorescent materials and particularly to such materials emitting ultraviolet radiations in the so-called "black light" region.

I have found that use of a lead-activated barium silicate in proportions greatly different from those corresponding to the usual silicates gives a remarkable increase in the fluorescent emission of ultraviolet radiations in the neighborhood of 3500 Angstrom units. This difference appears to result from some change produced in the resultant compound when silica to barium ratio is increased above 1.5. The emission at the metasilicate ratio of 1.0 and at a ratio of 1.5 is about the same; but the emission more than doubles when the ratio is increased from 1.5 to 2.0, attains a maximum at about 2.5, and still retains a high value when the ratio is increased to 4.5.

My invention thus results in a new phosphor of increased brightness, cheaply and easily prepared; and a phosphor which stands very well the usual heat-treatment incident to being coated onto the glass envelope of a fluorescent lamp.

In preparing a material according to the invention, I may mix together, for example, silicic acid and barium carbonate in the proportions to give the desired ratio of silica to barium 2.4 being a good ratio, and add lead peroxide in an amount say 4.88 per cent of the weight of silicic acid present. The silica content of the acid used may be about 90.5%. The materials may be ball-milled together in acetone, if desired, and after thorough mixing by this method, filtered and dried. Dry milling may be satisfactory, but the wet-milling was found preferable. The dried mixture may then be fired at 2100° F., for example. A good powder may be produced by 8 hours firing, but I have found periods of even 24 hours to be somewhat better. Other firing temperatures may be used, but I have found 2100° F. to be preferable. 1900° F. did not seem as good, and temperatures high enough to cause sintering do not produce powders of fine particle size. The lead content in the original unfired batch is preferably about 5% of the silicic acid content when the latter contains 90.5% silica. This means about 4.5% of the actual silica content. Half this amount of lead may be used, or twice it, but the value mentioned will give much better results.

The following table shows the variation in "black light" emission with change in the mole ratio of barium to silica:

| Barium Carbonate | Silicic Acid | Relative Emission |
|---|---|---|
| 1 | 1 | 5.7 |
| 1 | 1.5 | 5.7 |
| 1 | 2.0 | 14.7 |
| 1 | 2.5 | 16.4 |
| 1 | 3.5 | 14.6 |
| 1 | 4.5 | 12.6 |

My phosphor may, of course, be coated on the inside of a discharge tube, for example as in U. S. Patent 2,355,258, issued to O. H. Biggs, and responds very well to the mercury 2537 Angstrom unit radiations.

The ratio to which I refer in describing and claiming my invention is the ratio of the number of moles of silica to the number of moles of barium, or barium oxide. In the claims I have called this the molar ratio.

What I claim is:

1. A fluorescent material consisting essentially of lead-activated barium silicate in which the molar ratio of silica to barium is not less than 2 nor greater than 4.5.

2. A fluorescent material consisting essentially of lead-activated barium silicate in which the molar ratio of silica to barium is approximately 2.5.

3. The combination of claim 1, in which the amount of lead present is between about 2.25% to 9%, measured in terms of the amount of lead peroxide to silica, and in which the radiation emitted by the phosphor is ultraviolet in the neighborhood of 3500 Angstrom units.

4. The combination of claim 2, in which the amount of lead present is between about 2.25% to 9%, measured in terms of the amount of lead peroxide to silica, and in which the radiation emitted by the phosphor is ultraviolet in the neighborhood of 3500 Angstrom units.

ROBERT J. GINTHER.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,299,510 | Steadman | Oct. 20, 1942 |

FOREIGN PATENTS

| Number | Country | Date |
|---|---|---|
| 119,671 | Australia | Mar. 5, 1945 |
| 572,771 | Great Britain | Oct. 23, 1945 |